United States Patent
Karmakar et al.

(10) Patent No.: US 12,430,566 B2
(45) Date of Patent: Sep. 30, 2025

(54) PERFORMANCE MODELING AND ANALYSIS OF ARTIFICIAL INTELLIGENCE (AI) ACCELERATOR ARCHITECTURES

(71) Applicant: HABANA LABS LTD., Caesarea (IL)

(72) Inventors: Bhaskar J Karmakar, Bangalore (IN); Anand R Kumar, Bangalore (IN); Rajagopal Hariharan, Bangalore (IN); Saurabh Tiwari, Bangalore (IN)

(73) Assignee: Habana Labs Ltd., Caesarea (IL)

( * ) Notice: Subject to any disclaimer, the term of this patent is extended or adjusted under 35 U.S.C. 154(b) by 1134 days.

(21) Appl. No.: 17/356,550

(22) Filed: Jun. 24, 2021

(65) Prior Publication Data

US 2022/0366267 A1 Nov. 17, 2022

(30) Foreign Application Priority Data

May 11, 2021 (IN) .............................. 202141021314

(51) Int. Cl.
*G06N 3/10* (2006.01)
*G06F 30/32* (2020.01)
*G06N 3/06* (2006.01)

(52) U.S. Cl.
CPC ............... *G06N 3/10* (2013.01); *G06F 30/32* (2020.01); *G06N 3/06* (2013.01)

(58) Field of Classification Search
CPC ............. G06N 3/10; G06N 3/06; G06F 30/32
USPC ....................................................... 716/109
See application file for complete search history.

(56) References Cited

U.S. PATENT DOCUMENTS

| | | | |
|---|---|---|---|
| 12,141,683 B2 * | 11/2024 | Raha ...................... | G06F 9/3001 |
| 2016/0034305 A1 * | 2/2016 | Shear .................... | G06F 16/285 |
| | | | 707/722 |
| 2016/0217368 A1 | 7/2016 | Ioffe et al. | |
| 2020/0371843 A1 | 11/2020 | Garg et al. | |
| 2021/0240526 A1 * | 8/2021 | Weber .................... | G06F 9/5016 |
| 2021/0271960 A1 * | 9/2021 | Raha ..................... | G06N 3/04 |
| 2021/0350233 A1 * | 11/2021 | Saboori ................. | G06N 3/088 |
| 2022/0067520 A1 * | 3/2022 | Dalli ...................... | G06N 20/00 |
| 2022/0083655 A1 * | 3/2022 | Yang .................... | G06F 21/577 |
| 2022/0147876 A1 * | 5/2022 | Dalli ..................... | G06N 20/00 |
| 2022/0156614 A1 * | 5/2022 | Dalli ..................... | G06N 5/048 |
| 2022/0374288 A1 * | 11/2022 | Kibardin ................ | G06N 3/084 |
| 2024/0104363 A1 * | 3/2024 | Klaiber ................. | G06N 3/063 |
| 2024/0114477 A1 * | 4/2024 | Yerramalli ............ | H04W 64/00 |
| 2024/0160924 A1 * | 5/2024 | Rackauckas ......... | G06N 3/063 |

(Continued)

OTHER PUBLICATIONS

Synopsis Inc, "Synopsis—Platform Architect", datasheet, pp. 1-5, year 2018.

(Continued)

*Primary Examiner* — Jack Chiang
*Assistant Examiner* — Suchin Parihar
(74) *Attorney, Agent, or Firm* — Meitar Patents Ltd.; Daniel Kligler

(57) ABSTRACT

A method includes receiving one or more input Artificial Intelligence (AI) networks, transforming the AI networks into respective graphs including interconnected logical operators, and mapping the graphs onto a design of a hardware accelerator including a plurality interconnected hardware engines. A performance of running the AI networks on the design of the hardware accelerator is simulated using a petri-net simulation.

22 Claims, 2 Drawing Sheets

(56) References Cited

U.S. PATENT DOCUMENTS

2024/0370521 A1* 11/2024 Zhou .......................... G06F 8/41
2025/0110808 A1* 4/2025 Kibardin ............... G06F 18/214

OTHER PUBLICATIONS

Mathworks Inc, "Petri Net Toolbox", pp. 1-2, years 1994-2021, as downloaded from https://uk.mathworks.com/products/connections/product_detail/petri-net-toolbox.html.
Eindhoven University of Technology, "CPN—A concrete language for high-level Petri nets", pp. 1-168, Apr. 24, 2021, as downloaded from https://web.archive.org/web/20210424143646/http://cpntools.org/wp-content/uploads/2018/01/cpn.pdf.
Choi et al., "Data-free Network Quantization with Adversarial Knowledge Distillation," arXiv:2005.04136v1, pp. 1-11, May 8, 2020.
U.S. Appl. No. 18/353,128 Office Action dated Aug. 22, 2024.
U.S. Appl. No. 17/088,625 Office Action dated Jun. 4, 2024.

* cited by examiner

PERFORMANCE MODELING AND ANALYSIS OF ARTIFICIAL INTELLIGENCE (AI) ACCELERATOR ARCHITECTURES

CROSS-REFERENCE TO RELATED APPLICATIONS

This application claims priority from India Patent Application 202141021314, filed May 11, 2021, whose disclosure is incorporated herein by reference.

FIELD OF THE INVENTION

The present invention relates generally to system design and analysis, and particularly to methods and systems for modeling and analysis of accelerator hardware and software architectures.

BACKGROUND OF THE INVENTION

The task of designing and evaluating computational systems that combine hardware and software, such as Artificial Intelligence (AI) accelerators, is highly complex. Various techniques for analysis and optimization of such systems are known in the art. For example, Synopsys, Inc. (Mountain View, California) provides a tool called "Synopsys Platform Architect™ Ultra" for analysis and optimization of multi-core System-on-Chip (SoC) architectures. As another example, U.S. Patent Application Publication 2020/0371843 describes techniques for evaluating optimization of a hardware engine.

SUMMARY OF THE INVENTION

An embodiment of the present invention that described herein provides a method including receiving one or more input Artificial Intelligence (AI) networks, transforming the AI networks into respective graphs including interconnected logical operators, and mapping the graphs onto a design of a hardware accelerator including a plurality of interconnected hardware engines. A petri-net simulation is used to simulate the performance of running the AI networks on the design of the hardware accelerator.

In some embodiments, transforming the AI networks includes modeling the logical operators in terms of performance costs incurred by computations and data-access operations performed by the logical operators. In some embodiments, transforming the AI networks into the graphs further includes defining one or more tensors, which are operated on by the logical operators. Mapping the graphs onto the design may include mapping the tensors onto memories of the hardware accelerator.

In a disclosed embodiment, mapping the logical operators onto the hardware engines includes receiving user input that specifies properties of the design of the hardware accelerator, and mapping the logical operators onto the hardware engines in accordance with the properties. In another embodiment, mapping the graphs onto the design, and simulating the performance of running the AI networks on the design, include evaluating both hardware and software components of the hardware accelerator.

In an embodiment, simulating the performance includes evaluating multiple alternative transformations of the AI networks into graphs including interconnected logical operators. In another embodiment, simulating the performance includes evaluating multiple alternative mappings of the graphs onto designs. In yet another embodiment, simulating the performance includes evaluating the performance of a given design of the hardware accelerator over a plurality of different AI networks.

In an example embodiment, simulating the performance includes simulating, using the petri-net simulation, an impact of access to shared hardware resources. In another embodiment, simulating the performance includes receiving user input that specifies a speed vs. accuracy setting for the petri-net simulation, and running the petri-net simulation in accordance with the specified speed vs. accuracy setting. In some embodiments, the method further includes specifying the design of the hardware accelerator using a hierarchical hardware description model.

There is additionally provided, in accordance with an embodiment of the present invention, a system including a compiler and a petri-net simulator. The compiler is configured to receive one or more input Artificial Intelligence (AI) networks, to transform the AI networks into respective graphs including interconnected logical operators, and to map the graphs onto a design of a hardware accelerator including a plurality of interconnected hardware engines. The petri-net simulator is configured to simulate a performance of running the AI networks on the design of the hardware accelerator.

The present invention will be more fully understood from the following detailed description of the embodiments thereof, taken together with the drawings in which:

DETAILED DESCRIPTION OF EMBODIMENTS

Overview

Figure 1:
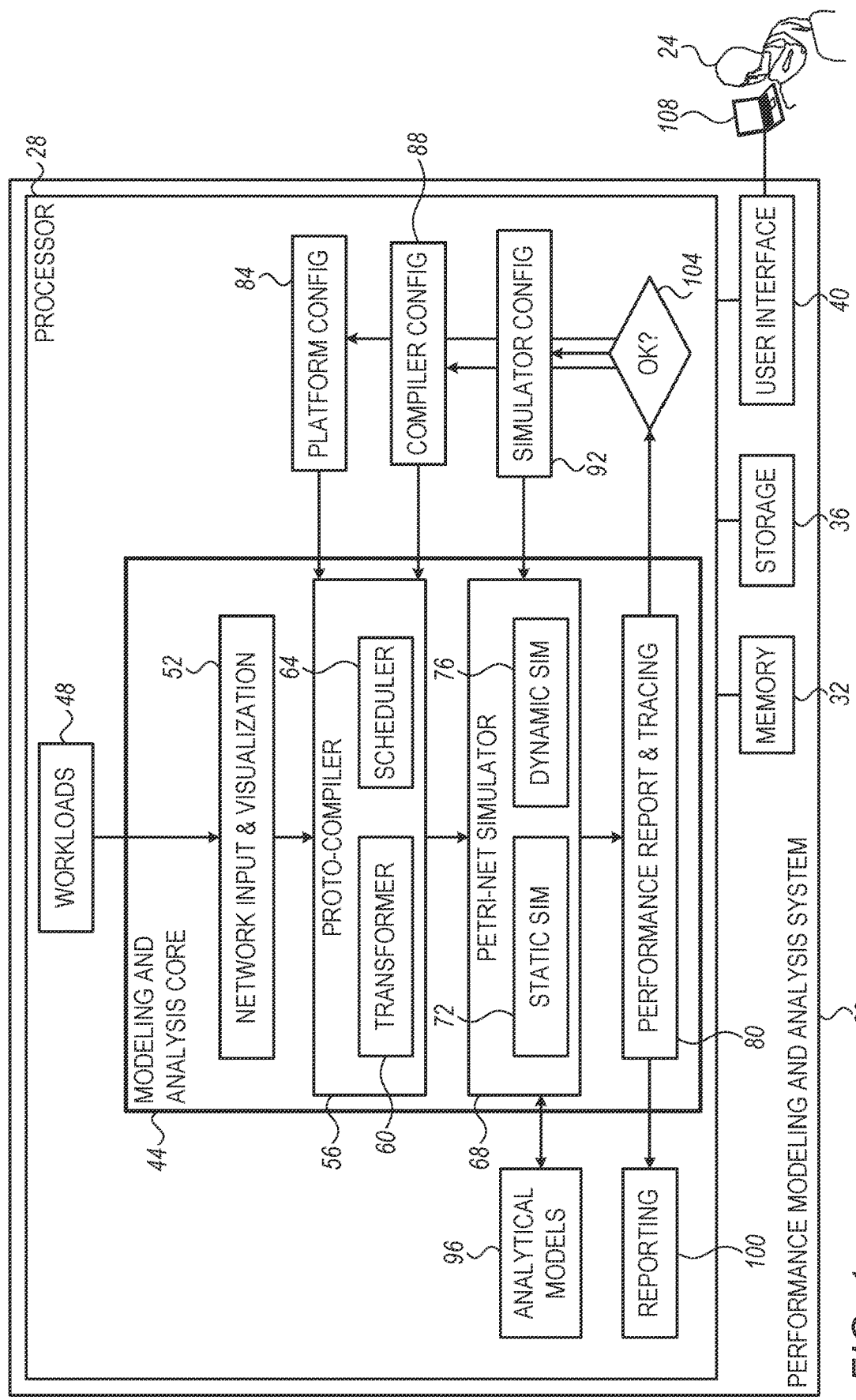
FIG. 1 is a block diagram that schematically illustrates a system for performance modeling and analysis of AI accelerators, in accordance with an embodiment of the present invention.

Embodiments of the present invention that are described herein provide improved methods and systems for designing, optimizing and evaluating the performance of hardware accelerators. The embodiments described herein refer mainly to accelerators that carry out Artificial Intelligence (AI) computations, by way of example. The disclosed techniques, however, are applicable to various other kinds of accelerators, typically application-specific accelerators optimized for a particular application.

Some embodiments described herein provide a system for modeling and simulation of AI accelerators. The system comprises a compiler and a petri-net simulator. The compiler comprises two major software components referred to as a transformer and a scheduler. Typically, the system receives as input (i) an initial definition of the AI accelerator design, (ii) multiple "workloads", i.e., AI networks whose computations are to be accelerated by the AI accelerator, (iii) a configuration of the compiler, and (iv) a configuration of the simulator. The system simulates the performance of the accelerator in executing the various workloads, using methods That are described in detail below.

In some embodiments, the transformer transforms each AI network (workload) into a respective graph. Each graph, which represents a respective workload, comprises (i) logical operators representing the computations defined in the workload, and (ii) tensors representing the data that the logical operators operate on. The logical operators and tensors are interconnected in the graph according to the computation flow of the workload. The scheduler maps each graph onto the design of the AI accelerator: The logical operators in the graph are mapped to hardware engines of the accelerator, and the tensors in the graph are mapped to accelerator memories. In addition, the operations are sequenced to honor the number of compute engines and the amount of memory available in the accelerator.

The output of the scheduler thus comprises a mapping of each workload onto the hardware engines and memories of the accelerator, along with the sequencing of operations. The simulator performs a petri-net simulation on the above-described mappings, so as to simulate the performance of running the AI networks on the design of the hardware accelerator.

The simulated performance can be used for improving the accelerator design, e.g., by iteratively testing various hardware and/or software configurations. In some embodiments, the system tests multiple alternative transformations of the workloads into graphs, and/or multiple alternative mappings of the graphs onto the hardware engines and memories.

Typically, the system models the logical operators and tensors in the workloads in terms of performance costs (e.g., required number of clock cycles and power consumption), as opposed to modeling the actual computations and data-access operations being performed. This kind of modeling dramatically reduces the complexity and runtime of the simulation.

The methods and systems described herein provide a fast and accurate framework for designing, optimizing and evaluation of accelerators. Both the hardware and software of the accelerator are evaluated. A wide range of AI applications for training and inference, as well as other application-specific acceleration tasks, can be evaluated. Any suitable accelerator architecture can be modeled and simulated, e.g., architectures based on custom Application-Specific Integrated Circuits (ASICs), Field-Programmable Gate Array (FPGA) based architectures and Graphics Processing Unit (GPU) based architectures.

When using the disclosed techniques, the user has full control over the level of abstraction of the accelerator design, and is able to set various speed vs. accuracy trade-offs. For example, the disclosed techniques can be used for evaluating the performance of intra-IP aspects (e.g., DSP pipeline), SoC/chip aspects, as well as inter-chip aspects (e.g., multi-chip over Ethernet).

System Description

FIG. 1 is block diagram that schematically illustrates a system 20 for performance modeling and analysis of AI accelerators, in accordance with an embodiment of the present invention. System 20 enables a user 24 to rapidly and accurately evaluate the performance of a design of an AI accelerator in executing various workloads.

In the present context, the term "AI accelerator" refers to a system element, typically comprising both hardware and software, which assists a host in performing AI computations. AI computations may comprise, for example, training an AI network, performing inference using an AI network, or any other suitable computations. The terms "AI", "Machine Learning (ML)" and "Deep Learning (DL)" are used interchangeably herein. AI accelerators may have various hardware and software architectures—For example, an accelerator may comprise one or more custom ASICs, one or more FPGAs and/or one or more GPUs. System 20 can be used for modeling and simulation of any such accelerator, or any other suitable accelerator.

System 20 is typically implemented on a suitable computer, such as a server or workstation. In the present non-limiting example, system 20 comprises a processor 28 that carries out the techniques described herein, and additional computer elements such as a memory 32, a storage device 36 and a user interface 40.

The main software component of system 20, running on processor 28, is a modeling and analysis core 44. Core 44 receives as input a plurality of workloads 48. Each workload 48 represents an AI network that the AI accelerator is designed to run (e.g., train or perform inference). Core 44 models the various workloads, and simulates the performance of the accelerator in executing them.

Core 44 comprises a number of software components, namely a network input and visualization module 52, a proto-compiler 56 (referred to herein simply as "compiler" for brevity), a petri-net simulator 68, and an update decision module 104. Compiler 56 comprises a transformer module 60 and a scheduler module 64. Simulator 68 comprises a static simulator 72 and a dynamic simulator 76. Core 44 further comprises a performance report and tracing module 80, which formats the simulation results, for reporting to user 24. User 24 typically views the results, provides inputs, and controls system 20 in general, using a user terminal 108.

In the present context, the term "petri-net simulation" refers to a discrete event simulation method built on a mathematical formalism used to describe distributed systems, where tensors are modeled as Places and operators typically as a hierarchy of Transitions and Places. The actual simulation proceeds according to the dynamic execution delay of dependent events, which models conflicts in a resource-constrained system. Examples of petri-net simulators comprise, for example, "CPN Tools" provided by Eindhoven University of Technology, the Netherlands, and a "Petri-Net Toolbox" for MATLAB, offered as a $3^{rd}$-party product by the MathWorks.

In addition to core 44, processor 28 further comprises the following modules:

A platform configuration 84—A definition or specification of the AI accelerator being evaluated by system 20. The platform configuration may specify, for example, the topology of the accelerator including hardware hierarchies, clock frequencies of the various hardware engines and memories of the accelerator, capacities and access bandwidths of the various memories of the accelerator, and/or any other suitable specification relating to the AI accelerator. The platform configuration may be defined, for example, as a hierarchical hardware description model.

A compiler configuration 88—A configuration of compiler 56. Configurable features may comprise, for example, network transformations to improve hardware efficiency, fine-grained control of mapping operators and tensors, and pipelining of sequential operations.

A simulator configuration 92—A configuration of petri-net simulator 68. Configurable features may comprise, for example, petri-net models, atomicity and buffering definitions (speed vs. accuracy setting), and/or any other suitable parameters.

Analytical models 96—Analytical models that quantify the performance costs of various operations, e.g., computations and memory-access operations, as will be elaborated further below.

A reporting module 100—A module that reports the simulation results to user 24 via user interface 40.

The configurations of system 20 and of processor 28, as shown in FIG. 1, are example configuration that are chosen purely for the sake of conceptual clarity. Any other suitable configurations can be used in alternative embodiments. For example, the different elements of processor 28 can be implemented using multiple processors rather that in a single processor. The different elements of system 20 may be implemented using suitable hardware, such as in one or more Application-Specific Integrated Circuits (ASICs) or Field-Programmable Gate Arrays (FPGAs), using software, or using a combination of hardware and software elements.

Typically, processor 28 comprises a general-purpose programmable processor, or a plurality of general-purpose programmable processors, programmed in software to carry out the functions described herein. The software may be downloaded to the processors in electronic form, over a network, for example, or it may, alternatively or additionally, be provided and/or stored on non-transitory tangible media, such as magnetic, optical, or electronic memory.

Performance Modeling and Analysis Method Description

Figure 2:
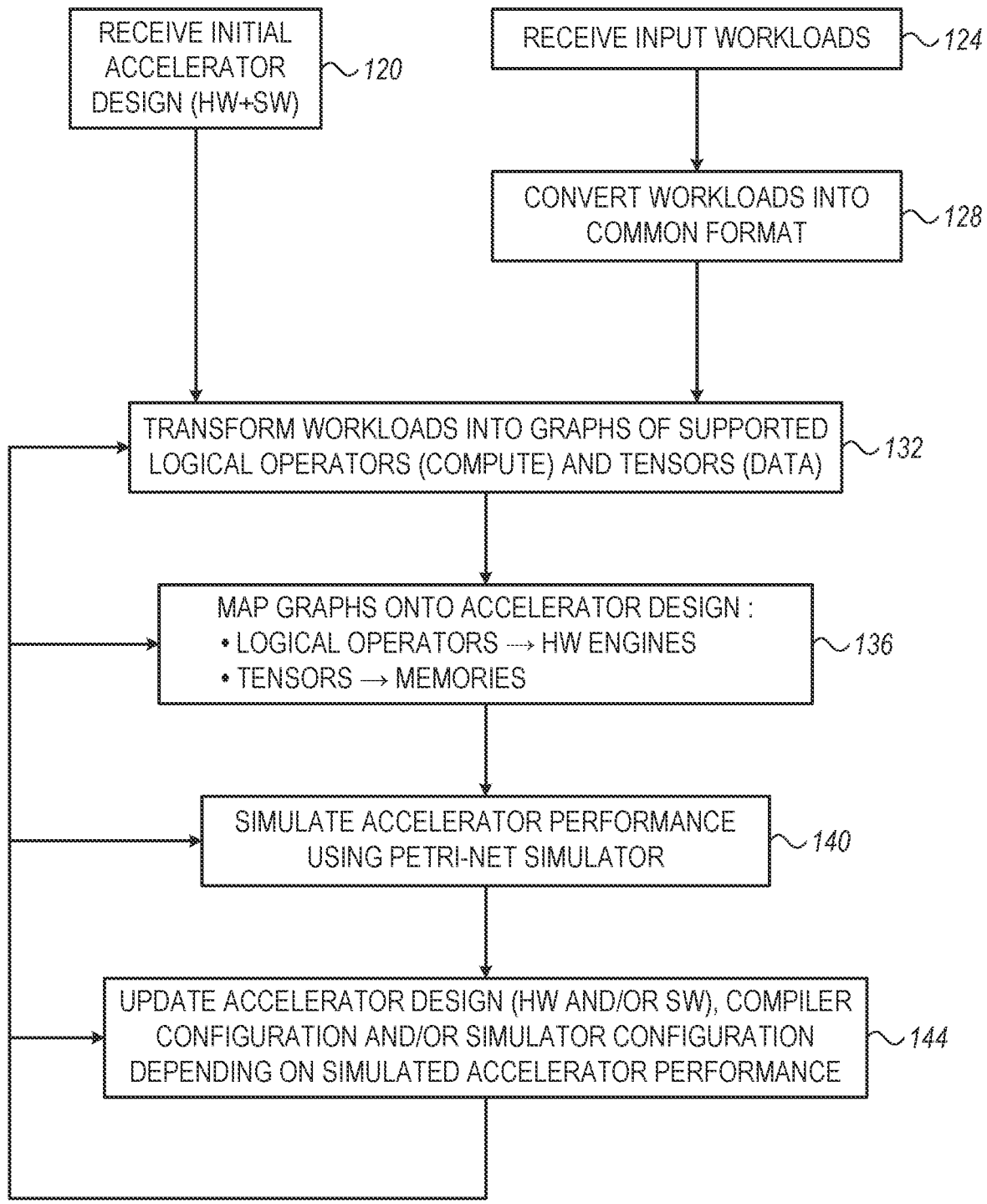
FIG. 2 is a flow chart that schematically illustrates a method for Performance modeling and analysis of AI accelerators using the system of FIG. 1, in accordance with an embodiment of the present invention.

FIG. 2 is a flow chart that schematically illustrates a method for performance modeling and analysis of an AI accelerator using system 20 of FIG. 1, in accordance with an embodiment of the present invention.

The method begins with system 20 receiving an initial design of the AI accelerator, at a design input step 120. The initial design typically comprises a topology and parameters of both the hardware and the software of the accelerator. The design is typically provided by user 24 as platform configuration 84 seen in FIG. 1. Typically, compiler configuration 88 and simulator configuration 93 are also provided at this stage by the user.

At a workload input step 124, system 20 further receives a set of workloads 48, over which the AI accelerator is to be optimized. The workloads may be provided to system 20 in any suitable format that is used for representing AI networks. Example input formats include ONNX (.onnx), TensorFlow (.pb or .meta), MxNet (.json), Caffe (.prototxt) and openVino (.xml). At an input pre-processing step 128, network input & visualization module 52 converts the workloads into a common format that is ready for subsequent processing by compiler 56. The common format may comprise, for example, an Abstract Syntax Tree (AST) format.

At a workload transformation step 132, transformer module 60 of compiler 56 transforms workloads 48 into respective graphs. Each graph, which represents a respective workload 48, comprises (i) logical operators representing the computations defined in the workload, and (ii) tensors representing the data that the logical operators operate on. The logical operators and tensors are interconnected in the graph according to the computation flow of the workload.

The logical operators are typically drawn from a set of operators that are supported by system 20. Example operators include a convolution operator, a matrix multiplication operator, a multiply-accumulate (MAC) operator, and the like. In some embodiments, core 44 models the logical operators and tensors in the workloads in terms of their performance costs, not in terms of the actual operations being performed. These models are typically stored as analytical models 96 of FIG. 1.

For example, a logical operator is typically modeled in terms of the number of clock cycles it incurs and the amount of power it consumes. Similarly, a tensor is typically modeled in terms of its expected latency and power consumption during transfer to and from the hardware engines for processing. As can be appreciated, such models are usually relatively high-level. This sort of modeling is considerably simpler than modeling the actual computations and data access operations being performed, but nevertheless provides sufficient information for accurate performance simulation.

At a mapping step 136, scheduler module 64 maps each of the above-described graphs onto the design of the AI accelerator. As part of the mapping operation, the logical operators in the graph are mapped to hardware engines of the accelerator, and the tensors in the graph are mapped to memories of the accelerator. In some embodiments, user 24 provides input that specifies properties of the design of the accelerator, and scheduler 64 performs the mapping operation in accordance with the properties. The output of scheduler 64 thus comprises a mapping of each workload 48 onto the hardware engines and memories of the accelerator.

At a simulation step 140, simulator 68 performs a petri-net simulation on the mappings. Typically, dynamic simulator 76 is used for simulating contentions and other effects of access to shared memory resources or other shared hardware resources. Static simulator 72 is typically used for estimating a theoretical bound of the achievable performance by ignoring shared resource contentions. The static simulator is thus faster than the dynamic simulator, while being less accurate.

The petri-net simulation outputs the expected performance of the current design of the AI accelerator in processing the set of provided workloads 48. System 20 may report the simulation results to user 24 using reporting module 100.

At an updating step 144, user 24 may update the accelerator design (platform configuration 84 and/or compiler configuration) in response to the simulation results. The design updates may pertain to the hardware and/or software of the accelerator, for example, changing the mapping of operators to different hardware engines and/or tensors to different memory elements, and improving the pipelining of sequential operations.

Additionally, user 24 may update simulator configuration 92 based on the simulation results. For example, the simulator configuration may be updated to set a different trade-off between analysis speed and accuracy, by choosing a simpler petri-net model for non-conflicting operations, which makes the simulation run faster, but provides lower accuracy of results.

Following the updates, the method may loop back to step 132, to step 136 or to step 140, as appropriate, for performing another analysis iteration. Thus, for example, system 20 may simulate the performance of the updated accelerator design. Additionally or alternatively, system 20 may test alternative transformations of workloads 48 into graphs of logical operators and tensors, and/or test alternative mappings of graphs onto the hardware engines and memories of the accelerator.

The iterative modeling and simulation process described above may continue, for example, until user 24 decides to terminate it. In some embodiments, update decision module 104 may provide some automated indication as to whether the simulation results meet some defined design goal.

The flow of FIG. 2 is an example flow that is depicted purely for the sake of conceptual clarity. In alternative embodiments, any other suitable flow can be used.

Although the embodiments described herein mainly address accelerators that carry out Artificial Intelligence (AI) computations, the methods and systems described herein can also be used in other applications, such as for evaluating various other kinds of generic or application-specific accelerators. Examples of such accelerators are graphics and DSP engines, Ethernet routers and switches, and digital video encoders and decoders.

It will thus be appreciated that the embodiments described above are cited by way of example, and that the present invention is not limited to what has been particularly shown and described hereinabove. Rather the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A method, comprising:
receiving one or more input Artificial Intelligence (AI) networks;
transforming the AI networks into respective graphs comprising interconnected logical operators;
mapping the graphs onto a design of a hardware accelerator comprising a plurality of interconnected hardware engines; and
using a petri-net simulation on the mappings, simulating an impact of the design on access to shared hardware resources to thereby simulate a performance of running the AI networks on the design of the hardware accelerator.

2. The method according to claim 1, wherein transforming the AI networks comprises modeling the logical operators in terms of performance costs incurred by computations and data-access operations performed by the logical operators.

3. The method according to claim 1, wherein transforming the AI networks into the graphs further comprises defining one or more tensors, which are operated on by the logical operators.

4. The method according to claim 3, wherein mapping the graphs onto the design further comprises mapping the tensors onto memories of the hardware accelerator.

5. The method according to claim 1, wherein mapping the logical operators onto the hardware engines comprises receiving user input that specifies properties of the design of the hardware accelerator, and mapping the logical operators onto the hardware engines in accordance with the properties.

6. The method according to claim 1, wherein mapping the graphs onto the design, and simulating the performance of running the AI networks on the design, comprise evaluating both hardware and software components of the hardware accelerator.

7. The method according to claim 1, wherein simulating the performance comprises evaluating multiple alternative transformations of the AI networks into graphs comprising interconnected logical operators.

8. The method according to claim 1, wherein simulating the performance comprises evaluating multiple alternative mappings of the graphs onto designs.

9. The method according to claim 1, wherein simulating the performance comprises evaluating the performance of a given design of the hardware accelerator over a plurality of different AI networks.

10. The method according to claim 1, wherein simulating the performance comprises receiving user input that specifies a speed vs. accuracy setting for the petri-net simulation, and running the petri-net simulation in accordance with the specified speed vs. accuracy setting.

11. The method according to claim 1, further comprising specifying the design of the hardware accelerator using a hierarchical hardware description model.

12. A system, comprising:
a compiler, configured to receive one or more input Artificial Intelligence (AI) networks, to transform the AI networks into respective graphs comprising interconnected logical operators, and to map the graphs onto a design of a hardware accelerator comprising a plurality of interconnected hardware engines; and
a petri-net simulator, configured to simulate an impact of the design on access to shared hardware resources to thereby simulate a performance of running the AI networks on the design of the hardware accelerator.

13. The system according to claim 12, wherein the compiler is configured to model the logical operators in terms of performance costs incurred by computations and data-access operations performed by the logical operators.

14. The system according to claim 12, wherein the graphs further comprise one or more tensors, which are operated on by the logical operators.

15. The system according to claim 14, wherein the compiler is configured to map the tensors onto memories of the hardware accelerator.

16. The system according to claim 12, wherein the compiler is configured to receive user input that specifies properties of the design of the hardware accelerator, and to map the logical operators onto the hardware engines in accordance with the properties.

17. The system according to claim 12, wherein, in mapping the graphs onto the design and simulating the performance of running the AI networks on the design, the compiler and the petri-net simulator are configured to evaluate both hardware and software components of the hardware accelerator.

18. The system according to claim 12, wherein, in simulating the performance, the petri-net simulator is configured to evaluate multiple alternative transformations of the AI networks into graphs comprising interconnected logical operators.

19. The system according to claim 12, wherein, in simulating the performance, the petri-net simulator is configured to evaluate multiple alternative mappings of the graphs onto designs.

20. The system according to claim 12, wherein the petri-net simulator is configured to evaluate the performance of a given design of the hardware accelerator over a plurality of different AI networks.

21. The system according to claim 12, wherein the petri-net simulator is configured to receive user input that specifies a speed vs. accuracy setting, and to simulate the performance in accordance with the specified speed vs. accuracy setting.

22. The system according to claim 12, wherein the design of the hardware accelerator is specified using a hierarchical hardware description model.

\* \* \* \* \*